United States Patent Office 3,501,115
Patented Mar. 17, 1970

3,501,115
AIRFOIL POSITION CONTROL FOR VARIABLE GEOMETRY AIRCRAFT
Henri Deplante, Paris, France, assignor to Avions Marcel Dassault, Saint-Cloud, France, a company of France
Filed Dec. 18, 1967, Ser. No. 691,349
Claims priority, application France, Feb. 28, 1967, 96,822
Int. Cl. B64c 3/40, 13/42
U.S. Cl. 244—46      3 Claims

ABSTRACT OF THE DISCLOSURE

This invention relates to a device in a variable geometry aircraft for controlling the positions of the wings, said device comprising a jack mounted on the airframe and having symmetrically arranged movable jack members for pivoting the wings, and a rotary hydraulic motor for driving said jack under the control of the pilot.

---

The invention relates to a device for controlling the positions of the wings of a variable geometry aircraft, said device being designed to satisfy the requirements in terms of safety and in terms of precision of response to control impulses initiated by the pilot.

The device according to the invention is characterised by the combination of a mechanical jack integral with the airframe of the aircraft, and a rotary hydraulic motor for operating said jack and controllable from the aircraft cockpit.

The mechanical jack preferably has two outputs, i.e., it incorporates two moving force-transmitting elements which, under the control of the hydraulic motor, can execute movements which are symmetrical in relation to the longitudinal plane of symmetry of the aircraft, these elements being attached to the respective wings through the medium of links or other coupling elements.

The parts on which these moving elements of the jack are supported are preferably connected to one another so that the mutually opposite reactions applied thereto cancel each other out and are not transmitted to the airframe. It is also advantageous to incorporate these two parts into a single component which is attached to the fuselage.

The hydraulic motor will preferably be of dual design, employing two identical motor units operating in parallel to drive the jack and each provided with a clutch arrangement to cater for the eventually of jamming of one of the motors or breakdown of one of the hydraulic control circuits.

The position of the jack, and thus of the wings, is a function of the position of the pilot-operated control element.

The invention may be carried into practice in various ways but a practical embodiment of device according thereto will now be described by way of example with reference to the accompanying drawings.

Figure 1:
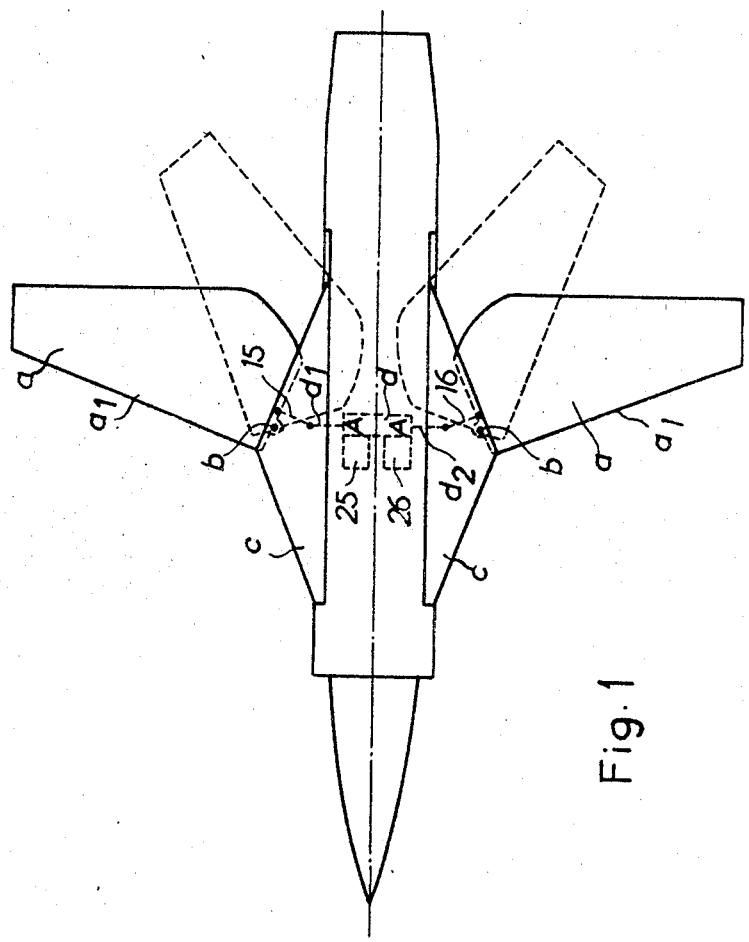
Figure 2:
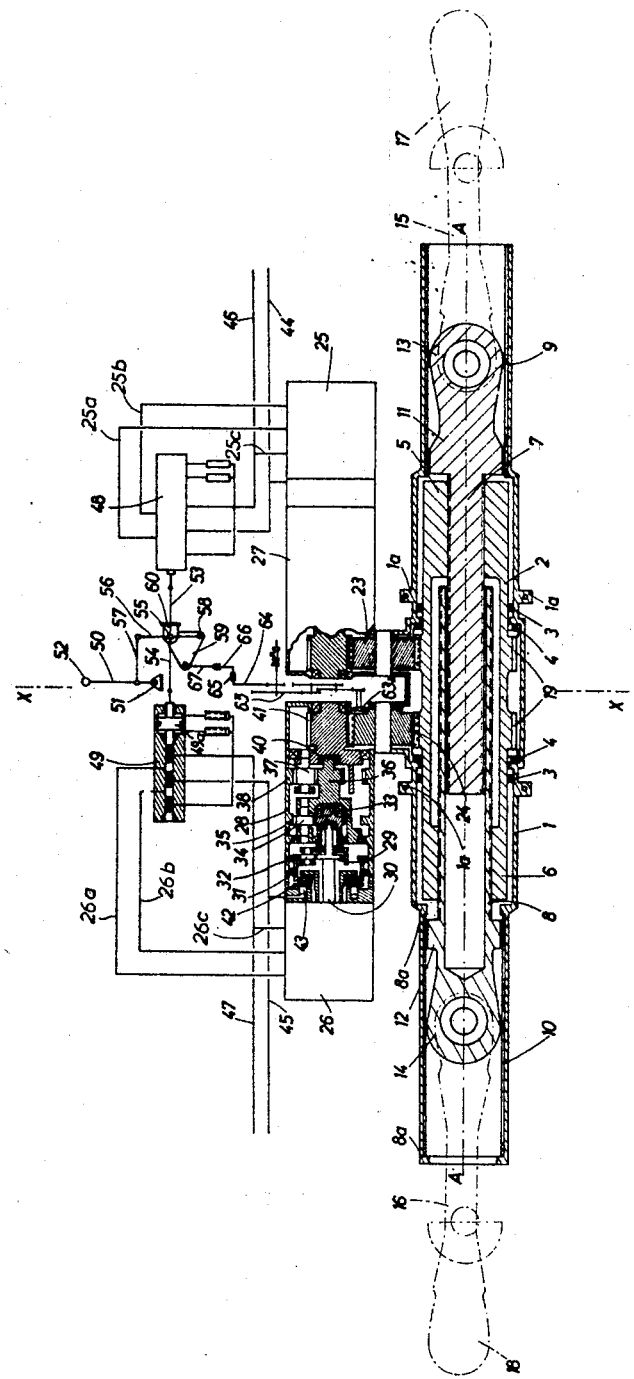

FIGURE 1 schematically illustrates, in horizontal projection, a variable geometry aircraft to which the control device in accordance with the invention is applied, and FIGURE 2 is an axial section of a particular preferred embodiment of the control device.

In FIGURE 1, an aircraft is shown whose two wings $a$ are each articulated about pivots $b$ situated on the fuselage at either side of the longitudinal plane of symmetry thereof. The fuselage surface joints at each side with the surface of a shaped skirt $c$ inside which the leading edge $a_1$ of the corresponding wing can engage, and which serves to provide continuity in the aerodynamic surfaces in the different angular positions which the wings can occupy between the position shown in full-line and that shown in broken-line.

A mechanical jack system $d$ has its housing fixed to the aircraft fuselage, this jack having two outputs, that is to say two force-transmitting movable elements $d_1$ and $d_2$, which are articulated to respective links 15, 16 and through these to the two wings $a$.

The jack is designed so that the movements of the two elements $d_1$ and $d_2$ take place symmetrically in relation to the longitudinal plane of symmetry of the aircraft, the positions of the wings thus at all times being perfectly symmetrical in relation to this plane.

The movement of the jack, that is to say of the two elements $d_1$ and $d_2$, is controlled by two hydraulic motors 25, 26 of rotary type, operating in parallel, so that each of the motors can control the movement of the two elements $d_1$ and $d_2$.

A particular embodiment of the combination of a mechanical jack of this kind with a hydraulic motor system, will now be described in the context of FIGURE 2. This embodiment, although highly advantageous, is not however to be considered in any way limitative of the invention.

The jack comprises a fixed housing 1, of generally cylindrical form, fixed to the airframe by lugs 1a so that the axis A—A of the housing, which is in fact the axis of the jack assembly, is perpendicular to the longitudinal plane of symmetry of the aircraft. The housing 1 accommodates a hollow cylindrical unitary component 2, which can rotate about the axis A—A, this component being axially centred in the housing by roller bearings 3 and longitudinally located by roller thrust bearings 4. The said component 2 constitutes at each of its extremities 5, 6 a nut co-operating with respective screws 7 and 8 (the threads of the screws and nuts are not indicated in the drawing). The axes of the two screws are collinear with the axis A—A of the assembly, and the screw 8, which is of larger diameter than the screw 7, contains a smooth-walled cylindrical bore, in which the screw 7 can rotate and move axially.

At each end, the housing 1 is formed with cylindrical extensions 9 and 10, whose internal walls contain longitudinal splines co-operating with similar splines formed on shoulders 11 and 12 integral with the respective screws 7 and 8. These splines enable the two screws to move translationally along the axis A—A, but prevent said screws from rotating.

The hand of the threads in nut 5 and on screw 7 is opposite to the hand of the threads in nut 6 and on screw 8, so that when the component 2, 5, 6 rotates about the axis A—A, the screws move apart or towards one another, in accordance with the direction of rotation. However, the thread pitches in the two screw and nut assemblies are identical, so that the translational movements of the screws 7, 8 are symmetrical in relation to the plane X—X, which is the general plane of symmetry of the system.

The screws 7, 8 terminate in yokes 13, 14 (elements $d_1$ of FIGURE 1), by means of which they are attached to the links 15 and 16 whose extremities 17 and 18 are respectively connected to the wings $a$, the latter thus being caused by the jack to execute symmetrical movements about the pivots $b$.

Stops 8a limit the extension and retraction of the jack. As illustrated, these stops can be designed to co-operate on one of the screws, co-operating for example with the splined shoulder 12 of the screws 8.

The cylinder 2 carries, for the purpose of effecting its rotation, two identical sets of gear toothing 19, which engage respectively with gears 23 and 24 operated by hydraulic motors 25 and 26.

The hydraulic motors 25 and 26, which have not been illustrated in detail, may for example be one of the conventional positive displacement type rotary motors, employing pistons and cylinders, and driving the gears 23 and 24, respectively, through the medium of respective reduction gearing sets 27 and 28.

The drawing shows by way of example epicyclic reduction gear trains. These reduction gears each embody three epicyclic gear stages. The first stage includes a central gear 29 (which is fixed to the drive shaft 30), a planet gear 31 and an internal gear ring 32. The second stage includes a central gear 33 (which is fixed to the arm carrying the planet gears 31 of the first stage), planet gears 34 and a fixed gear ring 35. The third stage includes a central gear 36 (which is fixed to the arm carrying the planet gears 34 of the second stage), planet gears 37 and a fixed gear ring 38. The arm 40 carrying the planet gears 37 also carries an output gear 41 meshing with the gear 24 or 23, as the case may be, which in turn meshes with the gear toothing 19 on the cylinder 2.

The gear ring 32 of the first stage is rotatable in the housing of the reduction gear set. It is normally held stationary by a releasable coupling 42 comprising one or more plates locked in relation to the said gear ring 32 by the application of a removable force developed by application of oil pressure on a piston 43. The removal of this force, in either one of the reduction gear sets, allows the corresponding gear ring 32 to free-wheel, so that the corresponding motor is mechanically isolated in the event of breakdown or jamming, with the result that the jack can be operated by the remaining motor without the latter having to drive the one which has failed.

Each of the two hydraulic motors is associated with a separate supply circuit comprising a high pressure line 44 or 45 (leading from a hydraulic pressure source which is not shown), a low pressure return line 46 or 47 and a control multispool valve 48 or 49. The spools of the valves 48 and 49 are coupled through links to a lever 50 pivoting about a fixed point 51 and itself connected at 52 to a linkage system (not shown) which terminates with a control element located in the aircraft cockpit.

Each motor, 25 or 26 as the case may be, is connected to its valve through high pressure lines 25a, 25b or 26a, 26b, the two lines for each motor corresponding to the two possible directions of rotation. The return line 46 or 47 also communicates with the cylinder of a dashpot such as 49a, the piston of which is connected with the spools of the valve 48 or 49. Any abrupt reversal of operation of the system (which could lead to too great a mechanical strain on its various components) is thus avoided. The motor 25 or 26 is further connected through respective low pressure lines 25c, 26c, with the return line 46 or 47. The input lines 25a and 26a correspond to a predetermined sense of rotation of the two motors, and therefore of the cylinder 2 of the jack. The lines 25b and 26b, respectively, correspond to the opposite sense of rotation. In this way, movement of the lever 50 in one direction about its pivot 51, causes the two motors and the jack cylinder 2 to rotate in one sense, whilst movement of the lever 50 in the opposite direction produces reverse rotation of the cylinder.

The valve spools are connected to th lever 50 through a feedback linkage. The links 53, 54 attached to the two spools are articulated at 55 to the centre of a lever 56 one end of which is connected through a link 57 to the lever 50 and the other end of which is articulated at 58 to a bellcrank 59 pivoting about a fixed mounting 60. The axis of articulation of this bellcrank 59 on the mounting 60 coincides geometrically with the axis of articuation 55 of the links 53 and 54 on the lever 56 when the control system is in the neutral position (as shown in FIGURE 2). The position of the bellcrank 59 in relation to the fixed mounting 60 is rendered dependant upon the rotation of the cylinder 2 of the jack, through the medium of a train of reduction gears 63 schematically shown in the drawing and deriving movement at 63a from one of the gears 23, 24. This train of gears terminates in a toothed sector 64, pivoting about a fixed axis 65 and integral with a lever 66 connected by a link 6 to the bellcrank 59 so that any pivoting movement on the part of the toothed sector 64 about its axis 65, produces pivotal movement of the bellcrank 59 in relation to the fixed mounting 60.

When the pilot operates the control to move the levers 50 and 56 so as to move the valve spools 48 and 49 in a certain direction and cause the cylinder 2 of the jack to rotate in the corresponding sense, the axis of articulation 55 between the lever 56 and the links 53, 54 no longer coincides with the axis of the pivot of the bellcrank 59 on the mounting 60. However, the train of gears 63, simultaneously driven by the cylinder 2, cause the toothed sector 64 to pivot, and consequently the bellcrank 59 also, the movement being in a direction such that the axis of articulation 55 returns to its neutral position and likewise the spools of the valves. The rotational movement of the motors and of the cylinder 2 of the jack, is thus stopped at the jack position which corresponds to the setting selected by the pilot.

In each reduction gear system, the piston 43 operating the releasable coupling device 42 is subjected to the fluid pressure produced by the hydraulic source in the line 44 or 45 as the case may be. Consequently in the event of hydraulic failure in one of the circuits, the corresponding hydraulic motor is disengaged from the mechanical transmission system, thus avoiding any power loss due to driving of the failed motor by the remaining motor, and therefore also avoiding any undesirable heating of the hydraulic fluid and the motor as a consequence of recycling of the small quantity of fluid which the motor contains.

Similarly, in the event that one of the motors seizes, it is possible by operating an auxiliary control which collapses the oil pressure on the piston 43 of the reduction gear system of this motor, to uncouple the jammed motor and continue to operate the wings using the other motor.

It will be apparent that the embodiments above described are simply examples and may be modified in various ways within the scope of the invention.

I claim:
1. In a variable geometry aircraft including a fuselage and a pair of wings movable with respect to the fuselage, a device for controlling the position of the wings comprising, in combination: a mechanical jack including a housing and a pair of force-transmitting elements movably mounted therein; means connecting said force-transmitting elements to the respective wings; a pair of hydraulic motors having each a rotary output shaft drivingly connected to the jack whereby each motor simultaneously moves both force-transmitting elements; separate fluid suply circuits for the respective motors; separate releasable coupling devices between each motor and the jack, each coupling device having a control element movable between an operative position wherein the motor is coupled to the jack and an inoperative position wherein the motor is uncoupled, and fluid pressure operated means to urge said control element to its operative position; and fluid pressure transmitting means connecting the fluid supply circuit for each motor with the fluid pressure operated means of its associated coupling device.

2. A control device according to claim 1, wherein the housing of said jack is fixedly secured to the fuselage of the aircraft and said force-transmitting elements are adapted to move translationally in said housing along an axis perpendicular to the longitudinal plane of symmetry of the aircraft, said jack further comprising two portions respectively supporting said force transmitting elements and taking up the reactions thereon from the respective wings, means locating said portions for rotation in said housing about said axis, and means mutually connecting said portions, whereby said reactions substantially cancel each other.

3. A control device according to claim 2, wherein the said two portions are formed as a single rotary component, said control device further comprising mechanical transmission means whereby said rotary component is connected with each of said hydraulic motors through the respective coupling devices.

References Cited
UNITED STATES PATENTS

| | | | |
|---|---|---|---|
| 2,511,265 | 6/1950 | Hoopingarner et al. | 244—46 |
| 2,822,995 | 2/1958 | Bowen | 244—46 |
| 2,870,748 | 1/1959 | Hemphill | 244—85 X |
| 2,988,307 | 6/1961 | Westbury | 244—85 |
| 3,071,336 | 1/1963 | Fearnside. | |
| 3,112,902 | 12/1963 | Kongelbeck | 244—85 X |
| 3,120,787 | 2/1964 | Schmitt | 244—85 X |
| 3,292,881 | 12/1966 | Ricard | 244—46 |
| 3,369,636 | 2/1968 | Nelson | 192—.098 X |

MILTON BUCHLER, Primary Examiner

J. L. FORMAN, Assistant Examiner

U.S. Cl. X.R.

244—85